July 23, 1929.  F. E. IVES  1,722,092

PHOTOGRAPHIC STRIP NEGATIVE AND COLOR PRINT MAKING SYSTEM

Filed April 21, 1926

INVENTOR:
FREDERIC E. IVES,
BY
ATTORNEYS.

Patented July 23, 1929.

1,722,092

UNITED STATES PATENT OFFICE.

FREDERIC EUGENE IVES, OF PHILADELPHIA, PENNSYLVANIA.

PHOTOGRAPHIC STRIP NEGATIVE AND COLOR-PRINT-MAKING SYSTEM.

Application filed April 21, 1926. Serial No. 103,642.

The ultimate object of my invention is to provide a most practical method of producing what are known as "still" photograph color prints sequentially disposed on a transparent film strip or ribbon in the manner of motion picture positives, and suitable for separate or sequential projection in a suitable optical lantern.

Since the actual production of the color prints may be carried out by any well-known process such as that of my U. S. Patent No. 1,538,816, May 19th, 1925, after the suitable strip negatives have been prepared, the invention which I shall describe and seek to protect is principally a method of preparing the strip negatives from which to make the color prints.

Since my object is to produce in one film strip a series of single or "still" images for separate time projection, and not a changing series to reproduce motion, and since the desired subjects may be of unlike character, size and location, and available for reproduction only at uncertain and unequal intervals of time, it is inconvenient and impracticable to obtain the original color record negatives suitably assembled by successive single exposures on a film strip.

My improved method, the advantages of which will be pointed out, consists in making the original color record negatives in a "still" camera, preferably of a size much larger than the images in the finished product, and making the strip negatives in an ordinary motion picture camera by single successive exposures to prints from the larger still camera negatives.

If a two color process is used, the original color selection negatives can be obtained by exposing in an ordinary camera a red sensitive and a green sensitive plate or film pressed together face to face, with the green sensitive plate nearest to the objective. In practice, the green sensitive plate may have a dye stain color screen coating as disclosed in my U. S. Patent No. 927,244, July 6th, 1909. and a yellow screen may be used at the lens, in order that the red sensitive plate may be acted upon almost exclusively by red light, and the green sensitive plate chiefly by green light.

These exposed plates or films when developed constitute the required color record of the objects which it is desired to reproduce in color, and from the method of their production, the red and green record images are in register when the plates or films are set to the same base line and side stop.

In further carrying out the process, one strip negative is made from a selected series of the green record negatives, and another from an identical series of red record negatives, or from positive prints therefrom. All of the green record negative images of the strip may be made by successive exposures to positives from the respective original green record negatives, and all of the red record negative images on a separate strip in the same manner. Subsequent automatic registration of the red and green images in the color print making process may be insured by the accurate feeding of the film strips in the camera if the original color record positives have been set to registering stops when making the strip negatives.

I have thus produced a suitable pair of black and white record negatives in strips suitable for the production, with automatic registration, of color prints by such a process as is set forth in my United States Patent No. 1,538,816, May 19th, 1925. The procedure can also be elaborated for the production of three color images, as set forth in my U. S. Patent No. 1,188,939, June 27th, 1916.

By this system the sequence of images in any film strip made up for educational or entertainment purposes can be arranged irrespective of the character of the subject or the time or place in which the original color record was made, and subjects can be used which it would be impracticable to make direct with a color motion picture camera. The strip negatives can also be made on special fine grained positive film, which costs less and is superior for the purpose to the panchromatic film which would have to be used for making the strip color negatives direct from the objects.

In the accompanying drawings:—

Figs. 2, 3 and 4 represent color record positives of one set of selected subjects.

Figs. 5, 6 and 7 represent complementary color record positives of the same set of subjects.

Fig. 8 represents a negative strip on which the subjects portrayed in Figs. 2, 3 and 4 are photographed.

Fig. 9 represents a negative strip on which the subjects portrayed in Figs. 5, 6 and 7 are photographed.

Fig. 10 represents a colored print produced by double exposure to the negative strips shown in Figs. 8 and 9.

Figure 1:
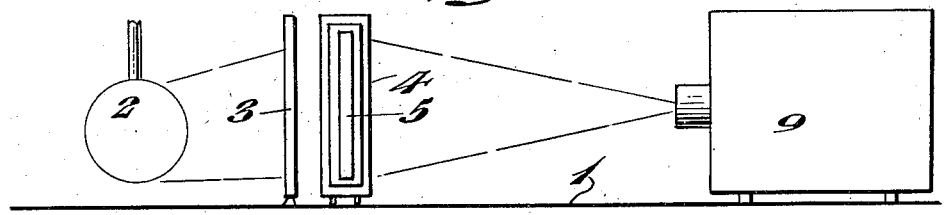
Fig. 1 represents a diagrammatic view showing various standard photographic appliances employed.
Figure 1:
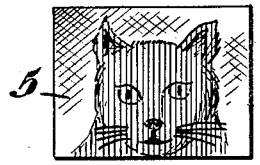
Figure 1:
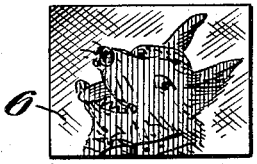
Figure 1:
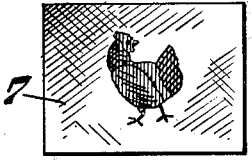
Figure 1:
Figure 1:
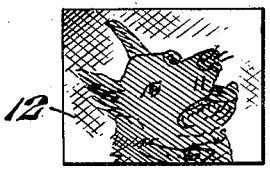
Figure 1:
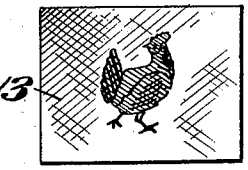
Figure 1:
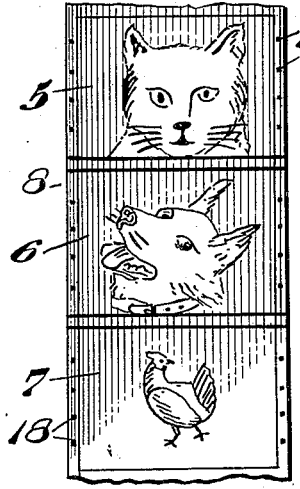
Figure 1:
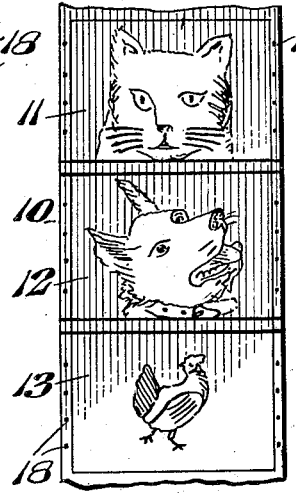
Figure 1:
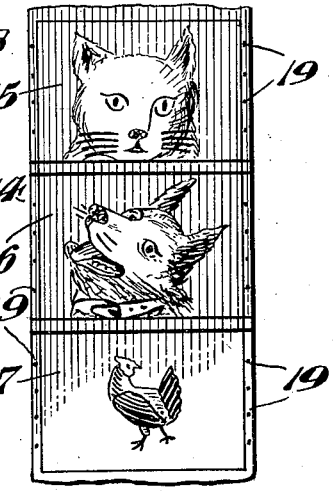

Referring to the drawings:

1 designates a support on which is mounted standard photographic apparatus comprising a source of light 2, a screen of opal or diffusing glass 3 and a frame or support 4, which supports the object to be photographed by the motion picture camera 9.

5, 6 and 7 represent glass color record positives of a series or set of selected subjects of any particular color record such as red, and 11, 12, and 13 represent glass color record positives of the same set of subjects but of a different complementary color record such as green.

The positives 5, 6 and 7 are successively photographed by the motion picture camera 9 on the film or strip negative 8, while the positives 11, 12 and 13 are successively photographed, in reverse, on the strip 10.

By the aid of the registering sprocket holes 18 in the film negatives 8 and 10, accurate alignment and registration of the pictures of the positives on said film negatives is assured. Thus, if any pair of holes 18 in the strip 8 is made to coincide with a corresponding pair in the strip 10, the pictures 5 and 11, 8 and 12, and 7 and 13, will coincide also.

The strip 14 is then exposed to both of said film negatives 8 and 10, to form the prints 15, 16 and 17, corresponding to the pairs of pictures on the negatives 8 and 10 respectively. The aligning holes 18 in the negatives 8 and 10, in addition to registering with each other, also align and register with the sprocket holes 19 in the strip 14 thus insuring perfect alignment or registration of the double exposure of said strip 14 to the strips 8 and 10. The exposure of the strip 14 to the negatives 8 and 10 prepared from different color record positives renders said strip susceptible to different, corresponding, complementary color dyes, so that when said strip 14 is properly exposed and treated, double or two color prints 15, 16 and 17 are produced, which are then ready for projection in a motion or a still camera at any desired rate of speed, to produce a picture in two colors.

It is to be understood that by my novel process a strip 14 having multi-color prints 15, 16 and 17 thereon may be produced, since my invention is not limited to the production of two color prints as will be apparent.

A distinct advantage of my invention is that I am enabled to secure any color record positives of any desired subjects, such as a work of art in a museum, a distant landscape or the like, where it will not be convenient or handy to employ a motion picture camera. Similarly, it may be necessary to prepare such positives by time exposure or under certain particular conditions for which only an ordinary camera will do and for which a motion picture camera is not quite practicable. Furthermore, by this novel process I am enabled to prepare positives on glass having a very fine grain so that when the color print is finally prepared and used for projection on a screen or the like, a clear view is obtained, it being well known that when a film is employed, and particularly when a picture is greatly reduced as on a motion picture film, a rough grain shows on the projected picture and produces a misty or blurred view not altogether clear and distinct.

By producing color prints on a continuous strip 14, I eliminate the use of patches which would otherwise be necessary to join and unite separate color prints, such patches being offensive to the eye during the projections of said prints.

It will be apparent it is a labor saving operation insuring identical disposition of the two complementary images with respect to the sprocket holes in the film, which it would be extremely difficult if not practically impossible to secure by cutting and piecing film strips, which is only adapted for single negative strips in monochrome work, where there is no exact registration problem involved.

It will now be apparent that I have devised a novel and useful photographic strip negative and color print making system which embodies the features of advantage enumerated as desirable in the statement of the invention and the above description, and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention what I claim as new and desire to secure by Letters Patent, is:—

1. The process of producing a multicolor print for still picture projection which consists in preparing complementary color record positives of a selected subject, preparing complementary color record negatives from said positives, successively exposing said negatives to a photosensitive plate, and finally printing from said plate.

2. The process of producing a continuous strip of multicolor prints for still and moving picture projection which consists in preparing continuous strips of complementary color record positives of a series of selected subjects, preparing a plurality of continuous negatives from said positives, accurately aligning the corresponding negatives of said subjects, successively exposing said negatives to a continuous photosensitive plate, and finally printing a continuous strip from said plate.

3. The process of producing a multi-color strip print for successive still picture projection which consists in preparing complementary color record positives of selected subjects, preparing complementary color record strip negatives from said positives by successive exposures on sensitive strips and finally making strip color prints from said complementary strip negatives.

FREDERIC EUGENE IVES.